(12) United States Patent
Escalettes et al.

(10) Patent No.: US 9,765,982 B2
(45) Date of Patent: Sep. 19, 2017

(54) REFRESHING DEVICE

(71) Applicant: SEB S.A., Ecully (FR)

(72) Inventors: Bertrand Escalettes, Menilles (FR); Sylvain Le Gall, Vernon (FR)

(73) Assignee: SEB S.A., Ecully (FR)

( * ) Notice: Subject to any disclaimer, the term of this patent is extended or adjusted under 35 U.S.C. 154(b) by 218 days.

(21) Appl. No.: 14/649,232

(22) PCT Filed: Nov. 28, 2013

(86) PCT No.: PCT/FR2013/052883
§ 371 (c)(1),
(2) Date: Jun. 3, 2015

(87) PCT Pub. No.: WO2014/087078
PCT Pub. Date: Jun. 12, 2014

(65) Prior Publication Data
US 2015/0323205 A1 Nov. 12, 2015

(30) Foreign Application Priority Data

Dec. 6, 2012 (FR) ...................................... 12 61732

(51) Int. Cl.
| | |
|---|---|
| *B01F 3/04* | (2006.01) |
| *F24F 6/16* | (2006.01) |
| *F04D 29/70* | (2006.01) |
| *F24F 5/00* | (2006.01) |
| *F24F 6/12* | (2006.01) |
| *F24F 7/007* | (2006.01) |

(Continued)

(52) U.S. Cl.
CPC ............ *F24F 6/16* (2013.01); *B01F 3/04042* (2013.01); *F04D 9/002* (2013.01); *F04D 29/705* (2013.01); *F24F 5/0035* (2013.01); *F24F 6/12* (2013.01); *F24F 7/007* (2013.01); *B01F 2215/008* (2013.01); *B05B 7/0075* (2013.01)

(58) Field of Classification Search
CPC .......... B01F 3/04042; B01F 2215/008; B05B 7/0075; F04D 9/002; F04D 29/705; F24F 5/0035; F24F 6/12; F24F 6/16; F24F 7/007
USPC ............................... 261/28, DIG. 3, DIG. 43
See application file for complete search history.

(56) References Cited

U.S. PATENT DOCUMENTS

| | | | | |
|---|---|---|---|---|
| 798,880 | A | * | 9/1905 | Cramer .................... F02M 1/00 159/4.07 |
| 1,730,866 | A | * | 10/1929 | Sternberg .................. F24F 6/06 261/28 |

(Continued)

FOREIGN PATENT DOCUMENTS

| | | |
|---|---|---|
| FR | 2677437 A1 | 12/1992 |
| FR | 2787351 A1 | 6/2000 |

(Continued)

*Primary Examiner* — Charles Bushey
(74) *Attorney, Agent, or Firm* — The Webb Law Firm

(57) ABSTRACT

Provided is a refreshing device including a fan mounted onto a base. The base includes a main container for storing a fluid, a mini fan, and a nebulizer to set in motion the fluid nebulized outside of the main container toward a diffuser positioned downstream from the fan. The diffuser includes an outlet opening having a substantially annular shape, the outlet surface of the outlet opening being substantially perpendicular to the direction of airflow generated by the fan.

11 Claims, 2 Drawing Sheets

(51) Int. Cl.
*F04D 9/00* (2006.01)
*B05B 7/00* (2006.01)

(56) References Cited

U.S. PATENT DOCUMENTS

| | | | | |
|---|---|---|---|---|
| 1,966,872 A * | 7/1934 | Simpson | .................... | F24F 6/06 |
| | | | | 261/30 |
| 2,063,921 A * | 12/1936 | Gray | ......................... | F24F 6/16 |
| | | | | 261/29 |
| 3,004,403 A * | 10/1961 | Laporte | ..................... | F24F 6/06 |
| | | | | 239/214.25 |
| 5,921,101 A * | 7/1999 | Wang | ................... | F24F 5/0035 |
| | | | | 62/280 |
| 6,257,501 B1 | 7/2001 | Roach et al. | | |
| 6,786,701 B1 | 9/2004 | Huang et al. | | |
| 7,510,170 B2 * | 3/2009 | Huang | ...................... | F24F 6/16 |
| | | | | 261/118 |
| 7,677,054 B2 * | 3/2010 | Dos Santos | ............... | F24F 6/16 |
| | | | | 62/304 |
| 8,985,556 B2 * | 3/2015 | Boulter | ................... | C02F 1/048 |
| | | | | 159/4.4 |
| 9,091,452 B2 * | 7/2015 | Yen | ........................... | F24F 6/12 |
| 2010/0270397 A1 | 10/2010 | Lin | | |
| 2014/0165639 A1 * | 6/2014 | Canipe | ................... | F24F 5/0035 |
| | | | | 62/259.4 |

FOREIGN PATENT DOCUMENTS

| | | | |
|---|---|---|---|
| GB | 2468328 A | | 9/2010 |
| WO | WO 2005/119130 A1 * | | 12/2005 |
| WO | WO 2008/006183 A2 * | | 1/2008 |

* cited by examiner

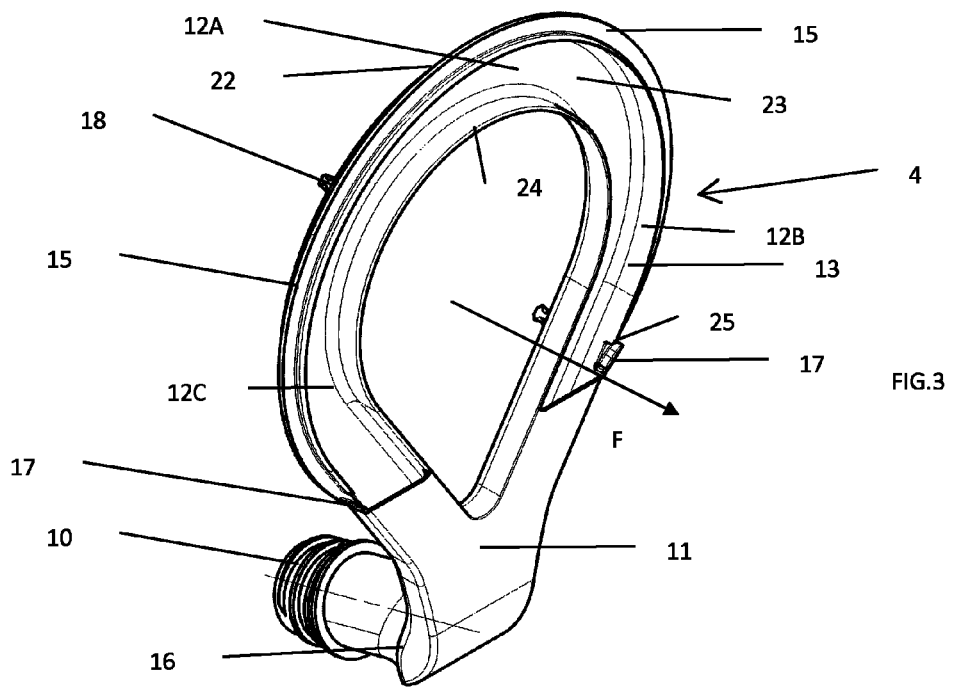
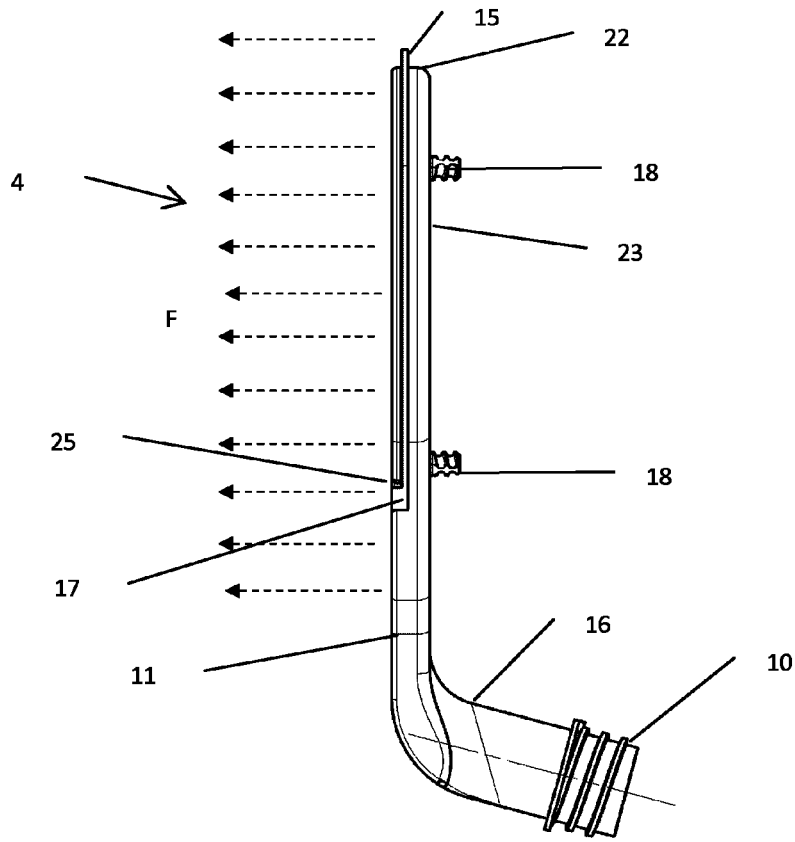

REFRESHING DEVICE

CROSS-REFERENCE TO RELATED APPLICATIONS

This application is the United States national phase of International Application No. PCT/FR2013/052883 filed Nov. 28, 2013, and claims priority to French Patent Application No. 1261732 filed Dec. 6, 2012, the disclosures of which are hereby incorporated in their entirety by reference.

FIELD OF THE INVENTION

This invention pertains to a refreshing device for blowing humidified and/or cooled air.

DESCRIPTION OF RELATED ART

There are existing refreshing devices in use, in the form of a pressurized spray for making people more comfortable in periods of extreme heat. One such device includes a press button that releases a mixture of propellant gas and water. This mixture passes through an outlet nozzle and is propelled outward under a pressurized effect, while forming water droplets. The disadvantage of such a device is that it has a very limited lifespan, due to the small capacity of its container. In addition, it does not allow for good control over the mixture propelled outward. The dimensions of the droplets forming this mixture are very unequal and highly variable. Moreover, such devices are not refillable and therefore generate waste. Finally, the drops sprayed tend to get the user wet.

Document FR2677437, on the other hand, describes a portable device that cools the surrounding air locally in an indoor room, by blowing air cooled by droplets of water sprayed into the stream of air. Such a device is useful for treating an indoor room, but it takes a certain amount of time before its effect can be felt by an occupant of the room. It does not replace the use of a mister in the form of a spray as described above, but has a supplemental effect. Moreover, this type of device generates very fine water droplets that evaporate quickly upon exiting the device.

However, it is apparent that the existing solutions for refreshing people are insufficient, and one general purpose of the invention is to provide an improved solution for refreshing people.

SUMMARY OF THE INVENTION

To this end, the invention is based on a refreshing device with a fan mounted on a base, the base having a main container for storing a fluid, a mini-fan and a nebulizer to move the nebulized fluid out of the main container toward a diffuser positioned downstream of the fan, characterized in that the diffuser has a roughly annular-shaped opening, the outlet surface of the opening being roughly perpendicular to the direction of airflow generated by the fan.

The diffuser in the invention can broadly diffuse droplets of fluid and increase the surface area over which people are exposed to the droplets.

In other variants of implementation:
The outer rim of the opening has a vent.
The diffuser has a closed portion upstream of the opening.
The closed portion has two branches to which the opening is connected.
The opening is formed by a profile, the cross-section of which is roughly rectangular.
The fan has a grill and the outlet opening of the diffuser is mounted on the grill.
The fan has a grill and the outlet opening of the diffuser is built into the grill.
The outlet surface of the opening is roughly coaxial to the fan.
The rim of the outlet opening has an anti-drip device to collect the drips toward the main container.
The anti-drip device has at least one slit and a flap formed in the rim of the diffuser.
The diameter of the outlet opening of the diffuser is between ¼ and ¾ the diameter of the fan.

BRIEF DESCRIPTION OF THE DRAWINGS

These purposes, characteristics and advantages of this invention will be presented in detail in the description below, based on one particular method of implementation, provided in a non-limiting manner, in reference to the drawings appended hereto, in which:

FIG. 3 shows a perspective view of the diffuser of a refreshing device according to one method of implementing the invention.

FIG. 4 shows a side view of the diffuser of a refreshing device according to one method of implementing the invention.

DETAILED DESCRIPTION OF THE INVENTION

Figure 1:
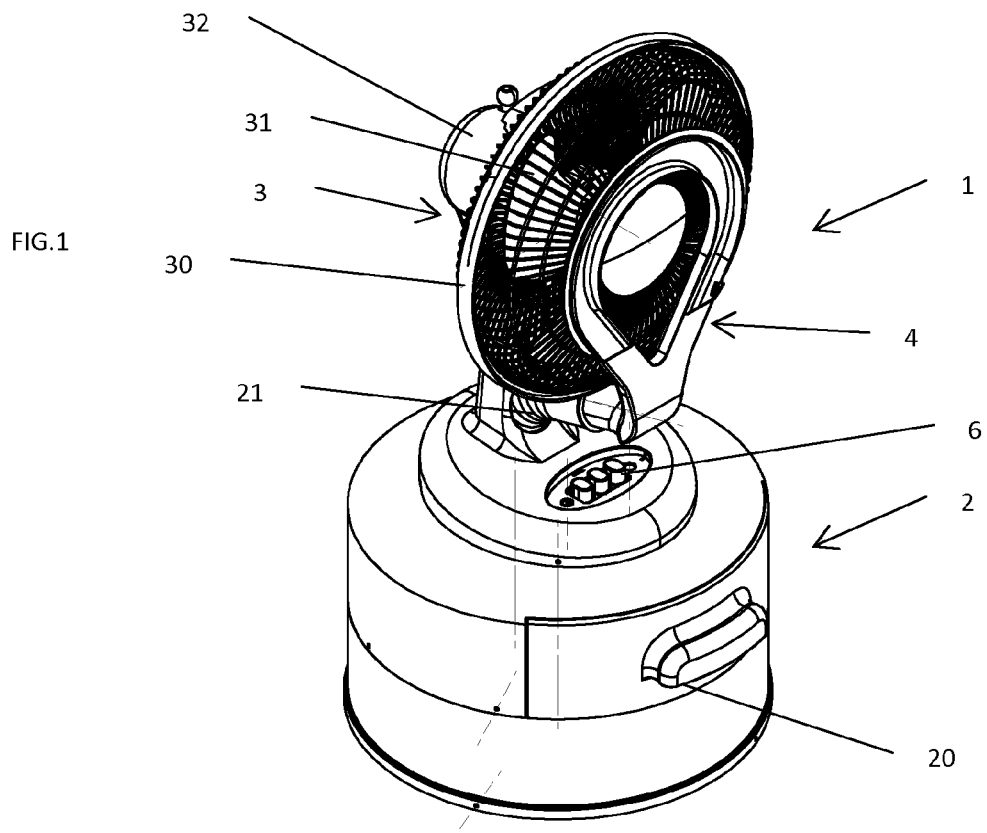
FIG. 1 shows a perspective view of a refreshing device according to one method of implementing the invention.
Figure 2:
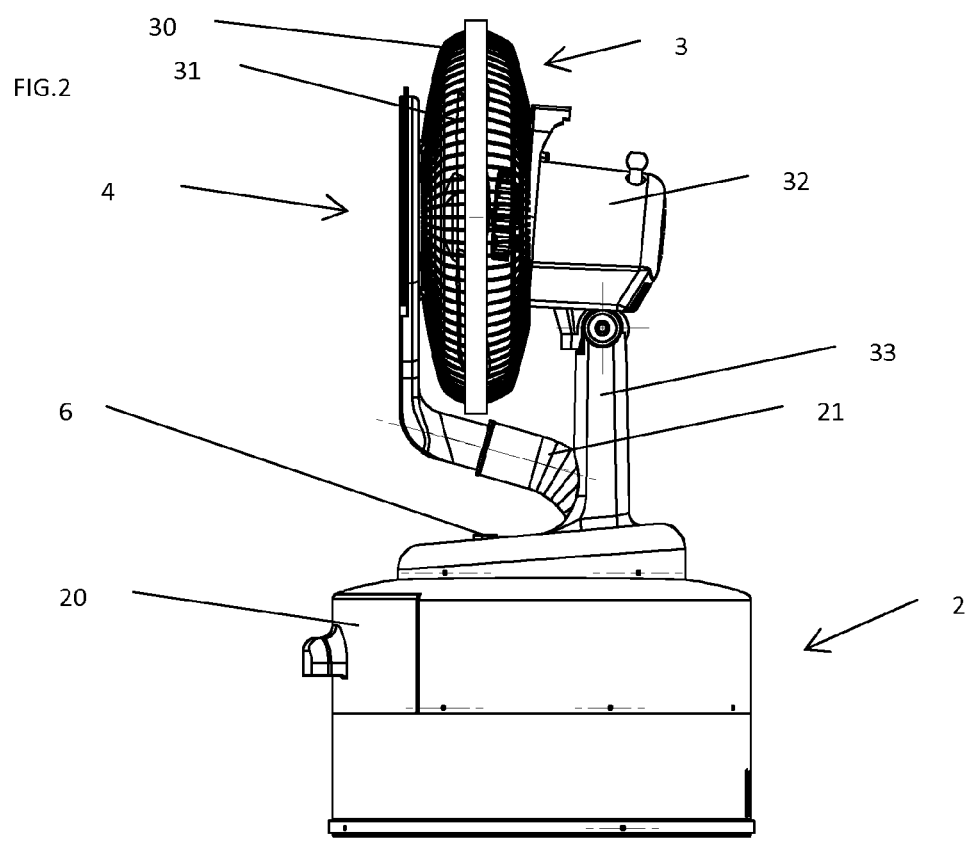
FIG. 2 shows a side view of a refreshing device according to one method of implementing the invention.

FIGS. 1 and 2 depict one method of implementing a portable refreshing device (1) described in the invention. This refreshing device (1) has a base (2) that contains a main container (20) for storing a cooling fluid, and preferably water. In the proposed example of implementation, the base (2) and the main container (20) are cylindrical in shape. However, other more elongated shapes, for example, that could form a large enough fluid container (on the order of 1 liter) can be used.

A fan (3) is attached to the surface of this base (2), to generate a stream of air. In addition, a diffuser (4) emits droplets from the main container of the base, just downstream of the fan (3). These droplets can thus be sprayed into the stream of air generated by the fan (3), thereby cooling this stream of air.

This refreshing device is thus presented as a misting fan. The droplets generated are very small in size (on the order of a few μm) so that they evaporate quickly in the stream of air. Indeed, by evaporating into the surrounding air, the fine droplets will help to decrease the temperature without causing the droplets to condense on the user.

The droplets are generated by a nebulizer connected to the main container. The nebulized fluid is then moved out of the main container (20) toward the diffuser (4) by a mini-fan (not depicted) located in the base. To do this, the diffuser (4) is connected to the main container (20) via the conduit (21). The conduit (21) is a hose, for example.

The fan (3) has, in the usual manner, a propeller (31) protected by a grill (30). The propeller (31) is spun by a motor (32) mounted behind the fan. This motor (32) can be mounted to pivot and/or oscillate on a foot (33) attached to the base (2).

In the invention, the diffuser (4) is attached to the fan (3), such that, when used normally, there is no relative movement between the fan (3) and the diffuser (4).

The refreshing device (1) also has a control panel (6). This control panel allows the user to start the device and adjust the various operating parameters of the device, such as the propeller's spin speed, the oscillation of the fan, activation of the nebulizer to generate droplets and the intensity of the nebulizer, among others.

The diffuser (4) in the invention will now be described in detail in reference to FIGS. 3 and 4.

In the invention, the diffuser (4) has a droplet outlet opening (13) that is roughly annular in shape. In addition, the outlet surface of the opening (13) is roughly perpendicular to the airflow (F) generated by the fan (3). The annular shape of the outlet opening (13) of the diffuser (4) positions the droplet dispersion zone away from the center, and disperses the fluid droplets over a greater surface area of the fan (3).

In the implementation variant shown in the drawings, the shape of the outlet opening (13) is a crown portion (12*a*) over an angular arc of approximately 300°. Each end of the crown portion extends in a direction that is roughly tangential to the crown portion, by a rectilinear section (12*b*, 12*c*). Other shapes are of course possible, to the extent that they take on roughly an annular shape.

The diffuser (4) has, upstream (in the direction the droplets are emitted), a closed portion (11). In the implementation variant depicted, this closed portion (11) extends the rectilinear sections (12*b*, 12*c*) of the crown (12*a*). This closed portion (11) thus forms a Y. The closed portion (11) is extended by a single conduit (16). The free end (10) of the single conduit (16) is connected to the conduit (21) of the main container.

In the implementation variant, the diffuser (4) is mounted on the front grill of the fan by means of pins (18) that are clipped onto the fan grill.

In another variant that is not depicted, the diffuser is built directly into the front grill of the fan. In other words, the diffuser (4) and the front grill of the fan form a single piece.

In order to improve dispersion of the droplets, the outlet opening (13) is coaxial, for example, with respect to the fan propeller. Thus, the central zone of the fan, in which the speed of airflow is the lowest, is avoided. The outlet opening (13) is thus positioned in a zone where the airflow is greatest, for better dispersion of the droplets. In addition, the diameter of the outlet opening (13) is smaller than the diameter of the fan. Thus, the outlet opening (13) does not create a pressure loss opposite the zone in which the airflow is the greatest (end of the propeller blades). Moreover, the droplets expelled through the outlet opening are not recirculated in the fan, thereby avoiding a condensation phenomenon on the propeller or the grill.

In one implementation variant, the diameter of the outlet opening (13) is between ¼ and ¾ the external diameter of the fan.

The outlet opening (13) of the diffuser (4) is formed by a profile that is open in the downstream direction of the fan's airflow. The profile has a bottom (23), an outer edge (22) forming the outer rim of the opening, and an inner edge (24). In the implementation variant depicted, the cross section of the profile is roughly rectangular. This shape allows the droplets to rise to the tip of the outlet opening (13), thereby obtaining a broader range of droplet diffusion.

In addition, the depth of the profile (height of the outer and inner edges (22, 24)) is small with respect to the width of the bottom (23) of the profile. Indeed, making the profile too deep causes increased droplet condensation. However, the depth should not be too small, in order to prevent the mist of droplets from being emitted from the diffuser (4) prematurely. In one implementation variant, the depth of the profile is approximately half the width of the bottom (23) of the profile.

To increase the droplet dispersion range, the outer edge (22) of the outlet opening (13) has a vent (15). The purpose of the vent (15) is to create a depression zone upstream of the vent (15) in the immediate proximity of the surface of the outlet opening (13). The depression zone thus created sucks the droplets toward the exterior, thereby broadening the droplet dispersion zone.

In the implementation variant depicted, the vent (15) is a wall protruding from the outer edge (22) of the opening (13). The vent (15) is roughly perpendicular to the airflow from the fan. The wall forming the vent (15) is no more than a few millimeters (approximately 7 mm) in height, so as not to create too significant a pressure loss in the airflow from the fan.

In order to prevent the formation of water droplets that would fall on the base or on the floor, the diffuser (4) has an anti-drip device (17, 25). This device (17, 25) collects the drips that form by condensation on the outer edge (22) of the diffuser (4). The anti-drip device has at least one slit (25) and one flap (17) formed in the outer edge (22) of the diffuser (4). The flap (17) is attached to the lower edge of the slit (25).

The flap(s) (17) and slits (25) are positioned in the lower portion of the opening (13) in order to collect any drips. Indeed, when a drip forms on the surface of the outer edge (22) of the opening (13), gravity causes it to run over the outer edge (22). At the slit(s) (25), the drips fall onto the corresponding flap (17) and then are drained to the main container through the closed portion (11) of the diffuser (4).

This invention is not limited to the examples of implementation described, but includes many modifications within the scope of the claims. Thus, the propeller fan could be replaced with a bladeless fan.

The invention claimed is:

1. Refreshing device with a fan mounted on a base, the base having a main container for storing a fluid, a mini-fan and a nebulizer to move the nebulized fluid out of the main container toward a diffuser positioned downstream of the fan, wherein the diffuser has a roughly annular-shaped outlet opening, a surface of the outlet opening being roughly perpendicular to a direction of airflow generated by the fan.

2. Refreshing device described in claim 1, wherein an outer rim of the opening has a vent.

3. Refreshing device described in claim 1, wherein the diffuser has a closed portion upstream of the outlet opening.

4. Refreshing device described in claim 3, wherein the closed portion has two branches to which the outlet opening is connected.

5. Refreshing device described in claim 1, wherein the outlet opening is formed by a profile, a cross section of which is roughly rectangular.

6. Refreshing device described in claim 1, wherein the fan has a grill, and the outlet opening of the diffuser is mounted on the grill.

7. Refreshing device described in claim 1, wherein the fan has a grill, and the outlet opening of the diffuser is built into the grill.

8. Refreshing device described in claim 1, wherein an outlet surface of the outlet opening is roughly coaxial to the fan.

9. Refreshing device described in claim 1, wherein a rim of the outlet opening has an anti-drip device for collecting and directing drips toward the main container.

10. Refreshing device described in claim 9, wherein the anti-drip device has at least one slit and a flap formed in the rim of the diffuser.

11. Refreshing device described in claim 1, wherein a diameter of the outlet opening of the diffuser is between ¼ and ¾ the diameter of the fan.

\* \* \* \* \*